United States Patent
Kato

(10) Patent No.: US 12,463,945 B2
(45) Date of Patent: *Nov. 4, 2025

(54) INFORMATION OUTPUT DEVICE, CAMERA, INFORMATION OUTPUT SYSTEM, INFORMATION OUTPUT METHOD, AND PROGRAM

(71) Applicant: NEC Corporation, Tokyo (JP)

(72) Inventor: Akira Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,659

(22) Filed: Jul. 28, 2023

(65) Prior Publication Data

US 2023/0370433 A1 Nov. 16, 2023

Related U.S. Application Data

(63) Continuation of application No. 17/542,688, filed on Dec. 6, 2021, now Pat. No. 12,177,191, which is a
(Continued)

(30) Foreign Application Priority Data

Jan. 15, 2015 (JP) .................... 2015-005538

(51) Int. Cl.
*H04L 9/40* (2022.01)
*G06F 21/60* (2013.01)
(Continued)

(52) U.S. Cl.
CPC ........ *H04L 63/0407* (2013.01); *G06F 21/602* (2013.01); *G06F 21/6245* (2013.01);
(Continued)

(58) Field of Classification Search
CPC . H04L 63/0407; H04L 63/0428; G06F 18/00; G06F 21/602; G06F 21/6245;
(Continued)

(56) References Cited

U.S. PATENT DOCUMENTS

| | | | |
|---|---|---|---|
| 5,822,360 A | * | 10/1998 | Lee ........................ G10L 19/018 375/147 |
| 5,974,396 A | | 10/1999 | Anderson et al. |

(Continued)

FOREIGN PATENT DOCUMENTS

| | | |
|---|---|---|
| JP | A-2000-322680 | 11/2000 |
| JP | 2001-344400 A | 12/2001 |

(Continued)

OTHER PUBLICATIONS

Andrea Generosi, "A deep learning-based system to track and analyze customer behavior in retail store," 2018, pp. 1-6 (Year: 2018).*

(Continued)

*Primary Examiner* — Luu T Pham
*Assistant Examiner* — Canh Le

(57) ABSTRACT

An information output device includes: a first output unit that outputs acquired information acquired by a sensor; and a second output unit that converts personal information included in the acquired information into attribute information from which identification of an individual is impossible, and outputs the attribute information.

9 Claims, 7 Drawing Sheets

Related U.S. Application Data continuation of application No. 16/434,038, filed on Jun. 6, 2019, now Pat. No. 11,227,061, which is a continuation of application No. 15/541,179, filed as application No. PCT/JP2016/051147 on Jan. 15, 2016, now abandoned.

(51) Int. Cl.

| | |
|---|---|
| *G06F 21/62* | (2013.01) |
| *G06Q 30/0201* | (2023.01) |
| *G06V 20/52* | (2022.01) |
| *G08B 13/196* | (2006.01) |
| *H04N 5/913* | (2006.01) |
| *H04N 7/18* | (2006.01) |
| *G06T 7/246* | (2017.01) |
| *G06V 40/16* | (2022.01) |

(52) U.S. Cl.
CPC ..... *G06F 21/6254* (2013.01); *G06Q 30/0201* (2013.01); *G06V 20/52* (2022.01); *G08B 13/19613* (2013.01); *G08B 13/19667* (2013.01); *H04L 63/0428* (2013.01); *H04N 5/913* (2013.01); *H04N 7/183* (2013.01); *G06T 7/246* (2017.01); *G06T 2207/30196* (2013.01); *G06T 2207/30232* (2013.01); *G06T 2207/30241* (2013.01); *G06V 40/173* (2022.01); *G06V 40/178* (2022.01); *H04N 2005/91364* (2013.01)

(58) Field of Classification Search
CPC ............ G06F 21/6254; G06Q 30/0201; G06V 20/52; G06V 40/173; G06V 40/178; G08B 13/19613; G08B 13/19667; H04N 5/913; H04N 7/183; H04N 2005/91364; H04N 5/77; G06T 7/246; G06T 2207/30196; G06T 2207/30232; G06T 2207/30241
See application file for complete search history.

(56) References Cited

U.S. PATENT DOCUMENTS

| | | | |
|---|---|---|---|
| 6,601,140 B1 | 7/2003 | Okaue et al. | |
| 8,009,863 B1 * | 8/2011 | Sharma | G06Q 30/02 382/107 |
| 8,010,402 B1 | 8/2011 | Sharma et al. | |
| 8,098,888 B1 | 1/2012 | Mummareddy et al. | |
| 8,254,633 B1 | 8/2012 | Moon et al. | |
| 8,577,705 B1 | 11/2013 | Baboo et al. | |
| 8,731,972 B1 * | 5/2014 | Wolf | G06Q 30/0201 705/37 |
| 9,769,368 B1 | 9/2017 | Morford et al. | |
| RE47,016 E | 8/2018 | Mizrachi et al. | |
| 10,713,670 B1 | 7/2020 | Moon et al. | |
| 2002/0152034 A1 | 10/2002 | Kondo et al. | |
| 2002/0174011 A1 | 11/2002 | Sanchez et al. | |
| 2002/0178085 A1 * | 11/2002 | Sorensen | G06Q 30/0201 705/7.29 |
| 2003/0048926 A1 | 3/2003 | Watanabe | G06K 9/00362 382/103 |
| 2003/0050838 A1 | 3/2003 | Suzaki et al. | |
| 2003/0081739 A1 | 5/2003 | Hikishima | |
| 2005/0180595 A1 | 8/2005 | Horii et al. | |
| 2006/0097045 A1 | 5/2006 | Tsutsui | G06Q 20/4014 235/383 |
| 2006/0210244 A1 * | 9/2006 | Fujita | H04N 1/4486 386/259 |
| 2006/0243797 A1 * | 11/2006 | Apte | G06Q 20/208 705/16 |
| 2006/0261162 A1 | 11/2006 | Kawada et al. | |
| 2007/0160349 A1 * | 7/2007 | Hayashi | G08B 13/19669 386/230 |
| 2007/0178909 A1 | 8/2007 | Doyle | |
| 2007/0282677 A1 | 12/2007 | Carpenter | |
| 2008/0249837 A1 * | 10/2008 | Angell | G06Q 30/0201 705/7.29 |
| 2008/0254888 A1 | 10/2008 | Morio et al. | |
| 2008/0300979 A1 | 12/2008 | Abhyanker | |
| 2009/0063168 A1 | 3/2009 | Finn et al. | |
| 2009/0150213 A1 | 6/2009 | Cyr et al. | |
| 2009/0271619 A1 * | 10/2009 | Fujii | G06F 21/88 713/193 |
| 2010/0217433 A1 | 8/2010 | Son | |
| 2011/0052081 A1 | 3/2011 | Onoe et al. | |
| 2011/0199461 A1 | 8/2011 | Horio | G06T 7/20 348/46 |
| 2011/0248992 A1 | 10/2011 | van Os | G06T 11/60 345/419 |
| 2011/0282662 A1 | 11/2011 | Aonuma et al. | |
| 2012/0025462 A1 | 2/2012 | Knowlton et al. | |
| 2012/0230596 A1 | 9/2012 | Watanabe et al. | |
| 2013/0120568 A1 | 5/2013 | Jensen, II | |
| 2013/0336550 A1 | 12/2013 | Kapur et al. | |
| 2014/0016775 A1 * | 1/2014 | Takahashi | H04N 1/32309 380/28 |
| 2014/0023248 A1 | 1/2014 | Yoo et al. | |
| 2014/0237221 A1 | 8/2014 | Choi | G06F 9/44505 713/1 |
| 2014/0247272 A1 | 9/2014 | Sako et al. | |
| 2014/0267659 A1 | 9/2014 | Lyon et al. | |
| 2014/0313327 A1 | 10/2014 | Motosass | |
| 2014/0316916 A1 | 10/2014 | Hay | |
| 2014/0344948 A1 | 11/2014 | Hayato | G06F 21/6218 726/26 |
| 2014/0362223 A1 | 12/2014 | LaCroix | H04N 7/183 348/150 |
| 2014/0363059 A1 * | 12/2014 | Hurewitz | G06Q 30/0201 382/118 |
| 2014/0375827 A1 | 12/2014 | Golan et al. | |
| 2015/0007281 A1 | 1/2015 | Omae et al. | |
| 2015/0010204 A1 | 1/2015 | Iwai | G06K 9/00771 382/103 |
| 2015/0012287 A1 | 1/2015 | Vucovich et al. | |
| 2015/0030155 A1 | 1/2015 | Park et al. | |
| 2015/0039451 A1 * | 2/2015 | Bonfiglio | G06V 40/70 705/15 |
| 2015/0055931 A1 | 2/2015 | Koivukangas | H04N 5/772 386/228 |
| 2015/0149216 A1 | 5/2015 | Suzuki et al. | |
| 2015/0169942 A1 | 6/2015 | Hu et al. | |
| 2015/0169961 A1 | 6/2015 | Ito et al. | |
| 2016/0042416 A1 | 2/2016 | Slowakowski | |
| 2016/0189170 A1 | 6/2016 | Nadler et al. | |
| 2016/0203499 A1 * | 7/2016 | Yamashita | G06V 20/52 705/7.29 |
| 2016/0343023 A1 | 11/2016 | Sorem | |
| 2016/0357762 A1 | 12/2016 | Aghdasi et al. | |
| 2017/0103432 A1 * | 4/2017 | Borchetta | G06Q 30/0279 |
| 2017/0300291 A1 * | 10/2017 | Lee | G06F 16/433 |

FOREIGN PATENT DOCUMENTS

| | | |
|---|---|---|
| JP | 2002-170104 A | 6/2002 |
| JP | 2005-236464 A | 9/2002 |
| JP | 2002-288300 A | 10/2002 |
| JP | 2002-305704 A | 10/2002 |
| JP | 2003-087771 A | 3/2003 |
| JP | A-2003-067551 | 3/2003 |
| JP | 2004-289323 A | 10/2004 |
| JP | 2004-328622 A | 11/2004 |
| JP | 2004-355453 A | 12/2004 |
| JP | A-2005-094642 | 4/2005 |
| JP | 2006-072564 A | 3/2006 |
| JP | 2006-113711 A | 4/2006 |
| JP | 2006-236255 A | 9/2006 |
| JP | 2006-319775 | 11/2006 |
| JP | 2006-350751 A | 12/2006 |
| JP | 2007-067972 A | 3/2007 |
| JP | 2008-225734 | 9/2008 |
| JP | A-2008-319775 | 11/2008 |

(56) References Cited

FOREIGN PATENT DOCUMENTS

| | | |
|---|---|---|
| JP | 2009-159221 | 7/2009 |
| JP | 2009-159553 A | 7/2009 |
| JP | 2011-77811 A | 4/2011 |
| JP | 2011-164811 A | 8/2011 |
| JP | 2012-022528 A | 2/2012 |
| JP | 2012-84077 | 4/2012 |
| JP | 2013-92855 | 5/2013 |
| JP | 2013-92955 | 5/2013 |
| JP | A-2013-115656 | 6/2013 |
| JP | 2013-131153 | 7/2013 |
| JP | 2013-115656 | 8/2013 |
| JP | 2013-186838 | 9/2013 |
| JP | 2014-207541 | 10/2014 |
| KR | 10-2013-0096569 A | 8/2013 |
| WO | 2004/039078 A1 | 5/2004 |
| WO | 2008/120395 A1 | 10/2008 |
| WO | WO 2014/174763 A1 | 10/2014 |

OTHER PUBLICATIONS

Ahmad Nasir et al. "Embedded System for Biometric Identification Based On Iris Detection," 2008, pp. 1-6. (Year: 2008).*

Andrea Generosi, "A deep learning-based system to track and analyze customer behavior in retails store," 2018, pp. 1-6 (Year: 2018).*

Office Action, dated Oct. 28, 2019, issued by the United States Patent Office in counterpart U.S. Appl. No. 15/541,179.

Office Action, dated Feb. 12, 2020, issued by the United States Patent Office in counterpart U.S. Appl. No. 15/541,179.

US Notice of Allowance for U.S. Appl. No. 16/434,014 mailed on Jan. 4, 2021.

Haluk Demirkan el al., Journal of Retailing and Consumer Services, "Developing a framework to improve virtual shopping in digital malls with intelligent self-service systems," 2014, pp. 860-868(Year: 2014).

Yi-Ying Shih et al., International Journal of Fuzzy System. vol. 16, No. 3, "Fuzzy Based Compensation for Image Stabilization in a Camera Hand-Shake Emulation System," Sep. 2014, pp. 350-357(Year:2014).

Tsuji Kentaro et al., JP2013186838. Machine translation, "Generation device, generation program, and generation method," Sep. 19, 2013, pp. 1-12.

Numamoto Hiroshi et al., JP2013131153. Machine translation, "Autonomous crime prevention warning system nd autonomous crime preention warning method," Jul. 4, 2013, pp. 1-15.

Yi-Ying et al. "Fuzzy Based Compensation for Image Stabilization in a Camera Hand-Shake Emulation System," Sep. 2014. pp. 350-358. (Year: 2014).

Colin Dixon et al., "The Home Needs an Operating System (an an App Store)," Oct. 2010, pp. 1-6. (Year: 2010).

US Office Action for U.S. Appl. No. 17/542,688 mailed on Mar. 2, 2023.

US Office Action for U.S. Appl. No. 17/542,688 mailed on Jun. 29, 2023.

Kobayashi Masaaki et al., JP2014-207541, Machine Translation, Oct. 30, 2014, pp. 1-49). (Year: 2014).

Tsuji Kentaro et al., JP2013186838, Machine Translation, Sep. 19, 2013, pp. 1-19). (Year: 2013).

US Office Action for U.S. Appl. No. 18/223,472, mailed on Mar. 14, 2024.

US Office Action for U.S. Appl. No. 18/223,467, mailed on Feb. 28, 2024.

Japanese Office Action for JP Application No. 2023-063596, mailed on Apr. 2, 2024 with English Translation.

Japanese Office Action for JP Application No. 2023-063597, mailed on Apr. 2, 2024 with English Translation.

US Office Action for U.S. Appl. No. 18/225,413, mailed on Mar. 19, 2024.

JP Office Action for JP Application No. 2023-063596, mailed on Jul. 9, 2024 with English Translation.

JP Office Action for JP Application No. 2023-063597, mailed on Jul. 9, 2024 with English Translation.

US Office Action for U.S. Appl. No. 18/223,467, mailed on Jun. 27, 2024.

US Office Action for U.S. Appl. No. 18/223,472, mailed on Jul. 9, 2024.

US Notice of Allowance for U.S. Appl. No. 17/542,688, mailed on Jul. 11, 2024.

US Office Action for U.S. Appl. No. 18/225,413, mailed on Jul. 11, 2024.

Masayuki Iwai et al., "A Marketing Analysis Using Massive Tiny Sensor Nodes," 2009, pp. 1-4 (Year: 2009).

Yi-Ying Shih et al., "Fuzzy Based Hand-Shake Compensation for Image Stabilization," 2012, pp. 40-44 (Year: 2012).

US Office Action for U.S. Appl. No. 18/223,467, mailed on Feb. 4, 2025.

US Office Action for U.S. Appl. No. 18/223,472, mailed on Feb. 11, 2025.

US Office Action for U.S. Appl. No. 18/223,472, mailed on Oct. 22, 2024.

US Office Action for U.S. Appl. No. 18/225,413, mailed on Oct. 28, 2024.

US Office Action for U.S. Appl. No. 18/223,467, mailed on Oct. 10, 2024.

US Office Action for U.S. Appl. No. 18/225,413, mailed on Feb. 21, 2025.

International Search Report, PCT/JP2016/051147, dated Apr. 5, 2016.

Notice of Reasons for Refusal (i.e., JP office action), JP patent app. No. 2019-037503 (identified in translation as 2019 "to" 037503), dated Dec. 3, 2019.

Notice of Reasons for Refusal (i.e., JP office action), JP patent app. No. 2019-037503, dated Mar. 30, 2020 (identified in translation as Reiwa 2(2020) Mar. 30).

Decision to Grant a Patent (i.e., JP notice of allowance), JP patent app. No. 2019-037503, dated Jul. 22, 2020 (identified in translation as Reiwa 2(2020) Jul. 22).

Notice of Reasons for Refusal (i.e., JP office action), JP patent app. No. 2020-147699, dated Aug. 31, 2021 (identified in translation as Reiwa 3(2021) Aug. 31).

Notice of Reasons for Refusal (i.e., JP office action), JP patent app. No. 2021-134114, dated Jul. 19, 2022 (identified in translation as Reiwa 4(2022) Jul. 19).

JP Office Action for JP Application No. 2023-063596, mailed on Sep. 9, 2025 with English Translation.

* cited by examiner

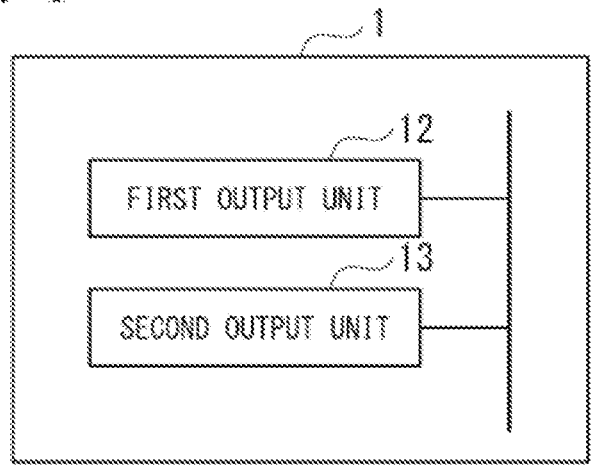

INFORMATION OUTPUT DEVICE, CAMERA, INFORMATION OUTPUT SYSTEM, INFORMATION OUTPUT METHOD, AND PROGRAM

CROSS-REFERENCE TO RELATED APPLICATIONS

The present application is a continuation application of U.S. patent application Ser. No. 17/542,688 filed on Dec. 6, 2021, which is a continuation application of U.S. patent application Ser. No. 16/434,038 filed on Jun. 6, 2019, which issued as U.S. Pat. No. 11,227,061, which is a continuation application of U.S. patent application Ser. No. 15/541,179 filed on Jun. 30, 2017, which is a National Stage Entry of international application PCT/JP2016/051147, filed Jan. 15, 2016, which claims the benefit of priority from Japanese Patent Application 2015-005538 filed on Jan. 15, 2015, the disclosures of all of which are incorporated in their entirety by reference herein.

TECHNICAL FIELD

The present invention relates to an information output device, a camera, an information output system, an information output method, and a program.

BACKGROUND ART

The spread of technologies related to IoT (Internet of Things) has led to various solutions being provided which utilize real-world data captured by cameras. As a representative example, security companies remotely monitor image data captured by security cameras and use it for security purposes such as helping crime prevention. Furthermore, a usage method can be considered where an observation camera is installed in a sales area to capture the purchasing behavior of customers, analyze the captured image data, and use it for marketing.

An image captured by a camera displays a face of an individual and the like, and the handling of the image data thereof presents a problem. Furthermore, although personal information (image information by which an individual can be identified) is necessary in a security-purpose system, in a marketing-purpose system it is sufficient if attribute information such as the age group and gender of the customer can be identified, and it is not necessary for an individual to be identified. Consequently, in general, a security-purpose surveillance camera and system, and a marketing-purpose observation camera and system are independently installed. As a result of such a configuration, a system for marketing is such that personal information (image information by which an individual can be identified) captured for security purposes is prevented from being leaked.

As a related technique, in Patent Document 1 is disclosed a system that, with respect to image data captured at a kindergarten and the like, protects the privacy of other kindergarten children in a case where a guardian of a certain kindergarten child wishes to browse that image data by distributing image data in which masking has been performed with respect to the faces of the kindergarten children other than the child of that guardian.

PRIOR ART DOCUMENTS

Patent Documents

[Patent Document 1] Japanese Unexamined Patent Application, First Publication No. 2009-159221

SUMMARY OF INVENTION

Problem to be Solved by the Invention

As mentioned above, if a security camera and system for security and an observation camera and system for marketing are separately installed, there are problems such as high costs and installation space shortages since the required equipment costs, installation costs, operation costs, and installation space are doubled.

An exemplary object of the present invention is to provide an information output device, a camera, an information output system, an information output method, and a program that solve the problems mentioned above.

Means for Solving the Problem

An information output device according to a first exemplary aspect of the present invention includes: a first output unit that outputs acquired information acquired by a sensor; and a second output unit that converts personal information included in the acquired information into attribute information from which identification of an individual is impossible, and outputs the attribute information.

An information output device according to a second exemplary aspect of the present invention includes: an output unit that outputs at least one of acquired information acquired by a sensor, and attribute information obtained by converting personal information included in the acquired information into information from which identification of an individual is impossible.

A camera according to a third exemplary aspect of the present invention includes any one of the above-mentioned information output devices.

An information output system according to a fourth exemplary aspect of the present invention includes: an information output device including a first output unit and a second output unit, the first output unit encrypting acquired information acquired by a sensor and outputting the encrypted acquired information, the second output unit converting personal information included in the acquired information into attribute information from which identification of an individual is impossible and outputting the attribute information; a first server terminal device that acquires the acquired information output by the first output unit; and a second server terminal device that acquires the attribute information output by the second output unit. The first server terminal device includes a decryption unit that decrypts the acquired information.

An information output system according to a fifth exemplary aspect of the present invention includes: an information output device including an output unit that outputs at least one of acquired information acquired by a sensor, and attribute information obtained by converting personal information included in the acquired information into information from which identification of an individual is impossible; a first server terminal device that acquires the acquired information output by the output unit; and a second server terminal device that acquires the attribute information output by the output unit. The first server terminal device includes a decryption unit that decrypts the acquired information.

An information output method according to a sixth exemplary aspect of the present invention includes: outputting acquired information acquired by a sensor; and converting personal information included in the acquired information into attribute information from which identification of an individual is impossible, and outputting the attribute information.

An information output method according to a seventh exemplary aspect of the present invention includes: outputting at least one of acquired information acquired by a sensor, and attribute information obtained by converting personal information included in the acquired information into information from which identification of an individual is impossible.

A program according to an eighth exemplary aspect of the present invention causes a computer of an information output device to execute: outputting acquired information acquired by a sensor; and converting personal information included in the acquired information into attribute information from which identification of an individual is impossible, and outputting the attribute information.

A program according to a ninth exemplary aspect of the present invention causes a computer of an information output device to execute: outputting at least one of acquired information acquired by a sensor, and attribute information obtained by converting personal information included in the acquired information into information from which identification of an individual is impossible.

Effect of the Invention

According to an exemplary embodiment of the present invention, it is possible to output encrypted information of image data captured by a single camera and information in which personal information is converted into attribute information.

BRIEF DESCRIPTION OF THE DRAWINGS

FIG. 1 is a diagram showing a configuration of an edge terminal device according to a first exemplary embodiment of the present invention.

FIG. 2 is a diagram showing a detailed configuration of an edge terminal device according to the first exemplary embodiment of the present invention.

EMBODIMENTS FOR CARRYING OUT THE INVENTION

First Exemplary Embodiment

Figure 3:
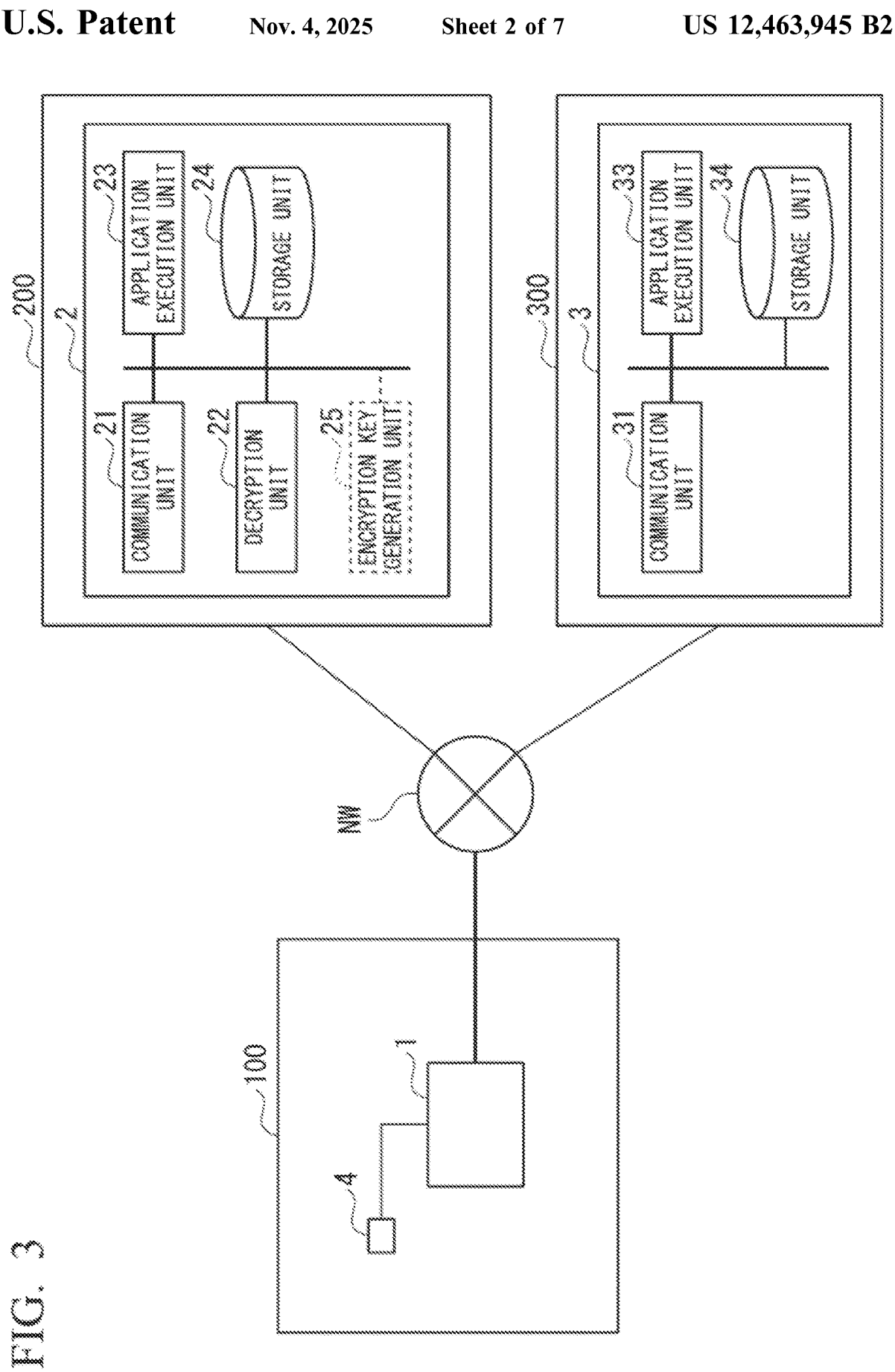
FIG. 3 is a diagram showing an example of an information output system according to the first exemplary embodiment of the present invention.

Hereunder, an edge terminal device 1 according to a first exemplary embodiment of the present invention is described with reference to FIG. 1 to FIG. 6.

FIG. 1 is a diagram showing a configuration of the edge terminal device 1 according to the first exemplary embodiment of the present invention.

As shown in FIG. 1, the edge terminal device 1 includes at least a first output unit 12 and a second output unit 13.

The first output unit 12 outputs acquired information that is acquired by a sensor.

The second output unit 13 converts personal information included in the acquired information that is acquired by the sensor into attribute information by which an individual cannot be identified, and then outputs it. The acquired information that is acquired by the sensor represents, for example, image data captured by a camera, audio collected by a microphone, a fingerprint, a palm print, a vein pattern, and an iris pattern.

FIG. 2 is a diagram showing a detailed configuration of an edge terminal device according to the first exemplary embodiment of the present invention.

As shown in FIG. 2, the edge terminal device 1 includes an information acquisition unit 11, the first output unit 12, the second output unit 13, a communication unit 14, an output determination unit 15, a storage unit 16, and a first connection unit 18.

The first connection unit 18 is connected to a sensor S installed in a space in which a customer is present.

The information acquisition unit 11 acquires from the sensor S, via the first connection unit 18, various sensing data (real-world data) related to the behavior of a customer and the environment surrounding the customer. The sensing data represents image data in which the customer has been captured for example. Hereunder, a case where the sensor S represents a camera, and the acquired information represents image data captured by the camera is described as an example. The image data includes video and still images.

The first output unit 12, for example, performs scrambling processing (encryption) with respect to image data acquired by the information acquisition unit 11, and outputs the data following scrambling processing to another device via the communication unit 14. The another device represents an information processing device such as a server that configures a security system of a security company for example.

The second output unit 13 performs personal information conversion processing, which converts personal information (information by which an individual can be identified) included in the acquired information into attribute information by which an individual cannot be identified. For example, the second output unit 13 may change a face of an individual appearing in the image data acquired by the information acquisition unit 11 into a mosaic, or replace it with an avatar. The second output unit 13 may analyze the image of a customer appearing in the image data using an image recognition technique to estimate the age group, gender, position information, and the like, of that customer. The second output unit 13 may calculate from the image data captured over a predetermined period, a flow line and at-shelf behavior of a customer appearing in that image data, and generate data (such as data converted to text) that represents the behavior of the customer as necessary for marketing. The second output unit 13 outputs the image data, in which personal information conversion processing has been performed, to another device via the communication unit 14. The another device represents, for example, an information processing device such as a server that configures a marketing system, which analyzes marketing information in a data center, and the like. A flow line represents information indicating a movement path of a customer. At-shelf behavior represents behavior relating to the selection of products performed by a customer in front of a product shelf.

The communication unit 14 performs communication with another device.

The output determination unit 15 determines whether or not data obtained by the personal information conversion processing performed by the second output unit 13, is to be output from the second output unit 13.

The storage unit 16 stores a program and various information.

The first output unit 12, the second output unit 13, and the output determination unit 15 are functions provided by a CPU (Central Processing Unit) provided in the edge terminal device 1 by executing a program.

FIG. 3 is a diagram showing an example of an information output system according to the first exemplary embodiment of the present invention.

The information output system shown in FIG. 3 includes at least one edge terminal device 1, at least one camera (sensor) 4, a server terminal device 2, and a server terminal device 3. The edge terminal device 1 is installed in a store 100. The camera 4 is connected to the edge terminal device 1. The server terminal device 2 is provided in a data center 200. The server terminal device 3 is provided in a data center 300. The edge terminal device 1 is installed comparatively near a customer, and performs processing that is appropriate to perform prior to transmission to the server terminal devices 2 and 3 of the data centers 200 and 300. In the first exemplary embodiment, for example, the edge terminal device 1 performs processing that encrypts personal information, and performs processing that converts personal information into attribute information by which an individual cannot be identified. The edge terminal device 1, the server terminal device 2, and the server terminal device 3 are connected via a network NW. In the server terminal device 2, a security system for surveillance is in operation. In the server terminal device 3, a marketing system is in operation.

As shown in FIG. 3, the server terminal device 2 includes a communication unit 21, a decryption unit 22, an application execution unit 23, and a storage unit 24. The communication unit 21 performs communication with another device, such as the edge terminal device 1 and the server terminal device 3. The decryption unit 22 decrypts image data following scrambling processing (encrypted) that is acquired from the edge terminal device 1. The application execution unit 23 executes respective application programs of the security system. The storage unit 24 stores the various application programs and decrypted image data.

As shown in FIG. 3, the server terminal device 3 includes a communication unit 31, an application execution unit 33, and a storage unit 34. The communication unit 31 performs communication with another device, such as the edge terminal device 1 and the server terminal device 2. The application execution unit 33 executes respective application programs of the marketing system. The storage unit 24 stores the various application programs, and image data following personal information conversion processing that is acquired from the edge terminal device 1.

The camera 4, for example, is installed at a position overlooking the store 100, and continuously captures a view of the interior of the store 100. The image data captured by the camera 4 is used with an object of monitoring shoplifting, robberies, and the like. In addition, it is also used to grasp the behavior of customers that shop at the store 100, with an object of utilization in marketing. The camera 4 outputs the captured image data to the edge terminal device 1. The edge terminal device 1 performs scrambling processing for security with respect to the acquired image data. The edge terminal device 1 transmits the image data, in which scrambling processing has been performed, to the server terminal device (external to the edge terminal device 1) 2. Furthermore, the edge terminal device 1 performs personal information conversion processing for marketing with respect to the acquired image data. The edge terminal device 1 transmits the image data in which personal information conversion processing has been performed, to the server terminal device (external to the edge terminal device 1) 3.

In the server terminal device 2, the security system is in operation. For example, a security guard monitors image data received by the server terminal device 2. The image data received by the server terminal device 2 is stored for a predetermined period as evidence in a storage device provided in the data center 200 (or the storage unit 24).

The server terminal device 3 analyzes, as objects, image data received from the edge terminal device 1 and data in which image recognition has been performed and then converted to text. The server terminal device 3 may, based on the analysis result, deduce a top-selling product for each age group and gender. The server terminal device 3 may calculate, based on the analysis result, a location through which many customers pass, from the flow lines of the customers within the store, and perform marketing analysis that generates information that serves as a reference for product arrangement locations. A flow line represents information showing the path moved by a customer.

The security image data is preferably image data that includes personal information (an image by which a face can be recognized for example). This is because it is necessary for the security system to identify the person that carried out the shoplifting, and the like. However, if image data that includes personal information is transmitted as is from the edge terminal device 1 of the store 100 to the server terminal device 2 of the data center 200 via the network NW, for example, it is possible for that personal information to be leaked by means of a packet being captured during network transmission. Consequently, in the edge terminal device 1, the first output unit 12 performs scrambling processing (encryption) with respect to the image data to be transmitted, by means of a predetermined method. The communication unit 14 transmits the image data following scrambling processing to the server terminal device 2. As a result, it is possible to prevent personal information from being leaked during network transmission. The server terminal device 2 performs descrambling processing with respect to the received image data, to return it to the original image prior to scrambling processing. A decryption key that decrypts the image data in which scrambling processing was performed by the first output unit 12, is held only by the server terminal device 2. Consequently, only the server terminal device 2 is able to decrypt the acquired image data, and restore the original image data that includes personal information. On the other hand, even if a third party obtains the image data transmitted by the first output unit 12, it is not possible to restore it to the original image data that includes personal information. Therefore, it is possible to prevent personal information from being leaked. The server terminal device 2 may enable monitoring by a security guard by utilizing the decrypted image data. The server terminal device 2 may also compare against image data of a person that has caused some problem behavior in the past who is registered in a so-called blacklist, and check if the person registered in the blacklist appears in the decrypted security image data.

Next, it is not necessary for the marketing data (or image data) to include data by which an individual can be identified. This is because in the marketing system it is sufficient if attribute information, such as the age group and gender of the customer, can be acquired. Furthermore, the transmission and reception of image data that includes personal information as is via the network NW, and storage in the server terminal device 3, and the like, is a problem from the perspective of personal information being leaked. Therefore, the second output unit 13 extracts, with respect to the image data captured by the camera 4, attribute information of a customer appearing in the image, which is configured by the image data, and transmits the extracted attribute information and the image data, which has been converted such that personal information cannot be recognized, to the server terminal device 3 of the data center 300. The processing that performs conversion such that personal information cannot be recognized is performed by the second output unit 13. The second output unit 13 may perform image processing that recognizes the face of a customer by means of image recognition, and then changes the area of the face into a mosaic for example. In this case, the second output unit 13 records the attribute information, such as the age group and gender of that customer, in the storage unit 16 such that it is associated with the identifying information of the same customer. The second output unit 13 may replace the face image of the customer with an avatar image. In this case, the avatar image that is substituted represents an avatar image that is associated with the attribute information such as the age group and the gender of that customer. The second output unit 13 may record the attribute information of the customer in the storage unit 16 such that it is associated with the identifying information of the avatar image. The second output unit 13 transmits to the server terminal device 3, together with the image data in which the conversion of personal information has been performed, data in which the attribute information of the customer has been associated with the customer or an avatar image. If the image data is such that the conversion of personal information has been performed, then there is no concern for leakage of personal information to occur even if it is stolen and accessed at the time of transmission and reception via the network NW. Furthermore, even if the image data, in which conversion of personal information has been performed, is stored on the server terminal device 3 for marketing analysis, there is no need for concern regarding the handling of personal information.

Since, the server terminal device 3 acquires image data which has been converted such that personal information cannot be recognized, and attribute information of the customer, it can perform marketing analysis. For example, the server terminal device 3 may acquire image data following personal information conversion processing and the attribute information of the customer, and perform analysis of flow lines showing the movement path of the customer in the store, and of the at-shelf behavior, such as which products were picked up and then actually purchased or returned to the shelf. In the present specification, the attribute information not only represents the age group and gender of the customer, but also includes flow lines, the at-shelf behavior, the position information of the customer, and the like. That is to say, the second output unit 13 is provided with a function of performing marketing analysis, and it may perform, by means of that function, analysis of flow lines and at-shelf behavior and generate information including the age group, gender, flow lines, and at-shelf behavior of the customer as text data. Further, the second output unit 13 may transmit the text data to the server terminal device 3.

Next, output processing by the edge terminal device 1 is described.

Figure 4:
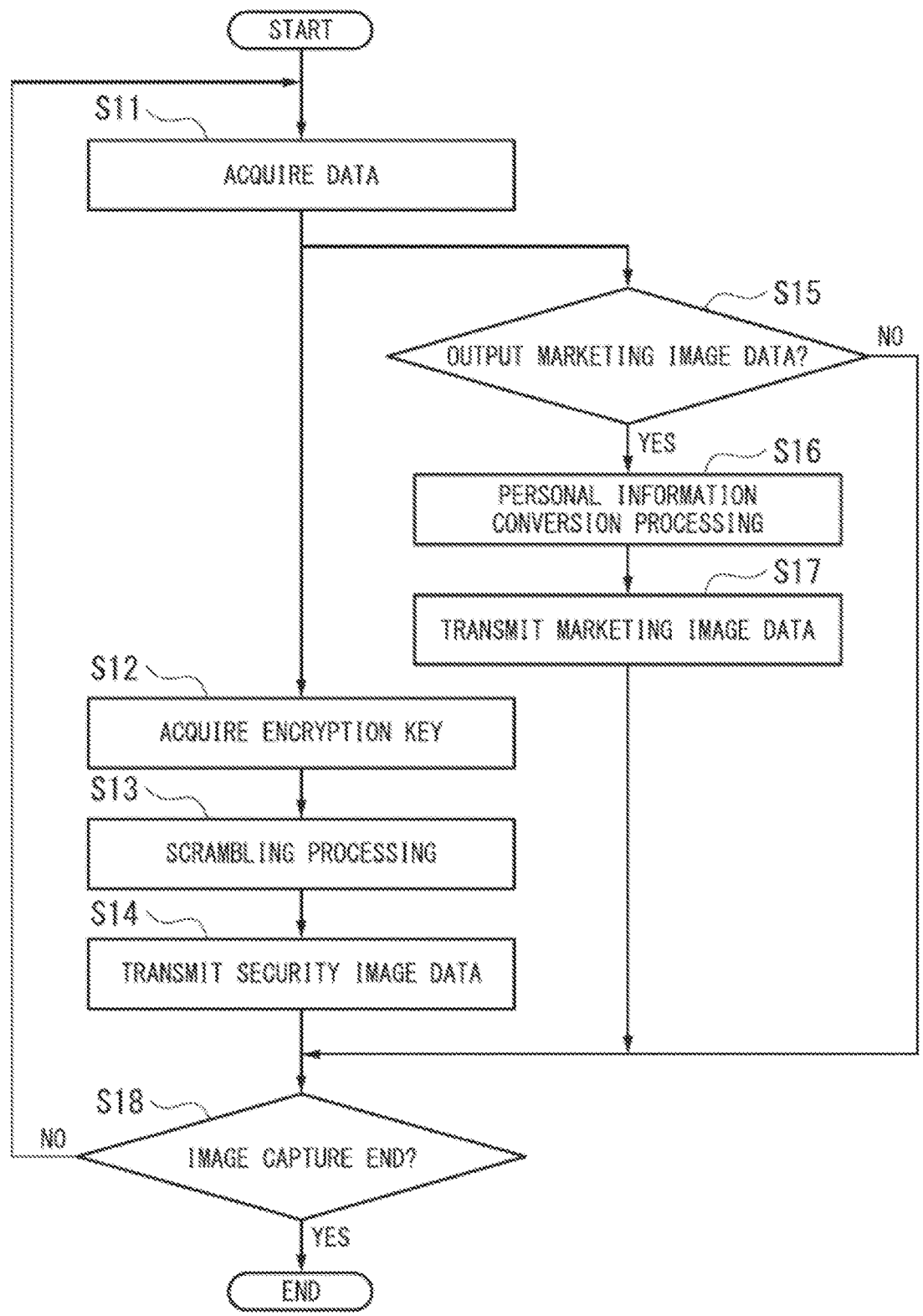
FIG. 4 is a diagram showing a process flow of the edge terminal device according to the first exemplary embodiment of the present invention.

FIG. 4 is a first diagram showing a process flow of the edge terminal device 1 according to the first exemplary embodiment of the present invention.

The processing by which the edge terminal device 1 converts and outputs image data is described with reference to FIG. 4. As a prerequisite, a state is assumed in which a view of the store 100 is being captured by the camera 4.

Firstly, in the edge terminal device 1, the information acquisition unit 11 acquires from the camera 4, image data captured by the camera 4 (step S11). The information acquisition unit 11 outputs the acquired image data to the first output unit 12. Then, the first output unit 12, for example, acquires an encryption key recorded beforehand in the storage unit 16 (step S12). Next, the first output unit 12 uses the encryption key to perform scrambling processing with respect to the image data acquired from the information acquisition unit 11 (step S13). The encryption key is, for example, a public key or a common key provided by the security system-side. The scrambling processing may be performed using a well-known image encryption method. Then, the first output unit 12 transmits the security image data following scrambling processing, to the server terminal device 2 via the communication unit 14 (step S14).

The edge terminal device 1 performs the following processing concurrently with the processing of step S12 to step S14. Firstly, the output determination unit 15 determines whether or not to perform output of marketing image data from the second output unit 13 (step S15). For example, if the current time is not within the business hours of the store 100, then there are no customers within the store 100 and purchasing behavior is not generated. Consequently, the utility value as image data for marketing is low. Therefore, in a time period where there are no customers, output of marketing image data is not necessarily performed. In this case, for example, the business hours of the store 100 are recorded beforehand in the storage unit 16. The output determination unit 15 reads out information regarding the business hours from the storage unit 16, and determines whether or not the current time is included in the business hours. If the current time is included in the business hours, the output determination unit 15 determines that output of marketing image data is to be performed. Even if the current time is within business hours, output of marketing image data may be not performed if there are no customers. In this case, a face image of the store clerk is recorded beforehand in the storage unit 16. The output determination unit 15 acquires image data from the image acquisition unit 11, and confirms whether a person other than the store clerk appears in the acquired image data by means of image recognition. If a person other than the store clerk appears in the image data, the output determination unit 15 may determine that output of marketing image data is to be performed.

If the output determination unit 15 determines that output of marketing image data is to be performed (step S15: Yes), the information acquisition unit 11 outputs the acquired image data to the second output unit 13.

The second output unit 13 performs personal information conversion processing with respect to the acquired image data (step S16). The second output unit 13 recognizes from the acquired image data, the people appearing in the picture, and estimates the age group and the gender of each person based on the face image of each person using a well-known face recognition technique or the like.

For example, the second output unit 13, recognizes the color of the clothing worn by that person or the like by a well-known color recognition technique, and may, using this as a symbol to identify that person, store attribute information, such as the estimated gender, and the person, in the storage unit 16 such that they are associated. The information in which the attribute information and the person are associated represents, for example, information in which a person, such as "a customer wearing red clothing", is associated with attribute information, such as "gender: female" and "age group: twenties".

Alternatively, the second output unit 13 may perform the following processing. That is to say, the second output unit 13 reads out an avatar image stored beforehand that corresponds to the estimated age group and gender from the storage unit 16. The second output unit 13 recognizes the face image of the person by means of a facial recognition technique. The second output unit 13 replaces the face image of the person with an avatar image that is similar to the contours of the face of that person.

As another alternative method, the second output unit 13 may perform the following processing in a case where it has a marketing analysis function. That is to say, the second output unit 13 acquires image data captured over a predetermined period. The second output unit 13 uses the clothing or the like worn by each person as a symbol to calculate position information of the person in each picture by, for example, a well-known technique such as a characteristic point extraction and object tracking technique. Further, the second output unit 13 may calculate a flow line for each person based on time series position information. The second output unit 13 may detect arm movements and face direction changes from a plurality of time series image data, and analyze the at-shelf behavior of the person by a movement in which the person extends a hand to the product shelf, by the direction in which the line-of-sight is directed, and the like. The second output unit 13 may generate data, in addition to the age group and the gender, in which information such as the flow line, and the at-shelf behavior, are converted to text. The data converted to text represents, for example, information such as "customer 001, male, twenties, moved between shelf A and shelf B, picked up product C and purchased it". The second output unit 13 outputs image data, which has been converted such that personal information cannot be recognized by the second output unit 13, or data converted to text. The second output unit 13 transmits marketing image data (including attribute information and data converted to text) to the server terminal device 3 (step S17).

If the output determination unit 15 determines that output of marketing image data is to not be performed (step S15: No), the processing proceeds to step S18.

Then, for example, if the camera 4 ends imaging in accordance with an imaging stopping operation by an administrator and the like (step S18: Yes), the current process flow ends. If the camera 4 is in a period in which imaging is continued (step S18: No), the processing from step S11 is repeated.

A case where, in step S13, an encryption key is recorded beforehand in the storage unit 16 was described as an example. However, the first exemplary embodiment is in no way limited to such a configuration. As an example, a case where the server terminal device 2 includes an encryption key generation unit 25 (refer to FIG. 3) is described. In this case, the encryption key generation unit 25 generates an encryption key (one-time password) at predetermined intervals. The communication unit 21 transmits that encryption key. The communication unit 14 acquires that encryption key via the network NW. The first output unit 12 performs scrambling processing with that encryption key.

The output determination unit 15 may determine by means of image recognition whether or not a person is included in the image data, and the first output unit 12 be made to perform scrambling processing only in a case where a person is included in the image data. The first output unit 12 may recognize the face of a person by means of image recognition, and perform scrambling processing with respect to only the face of the person.

Figure 5:
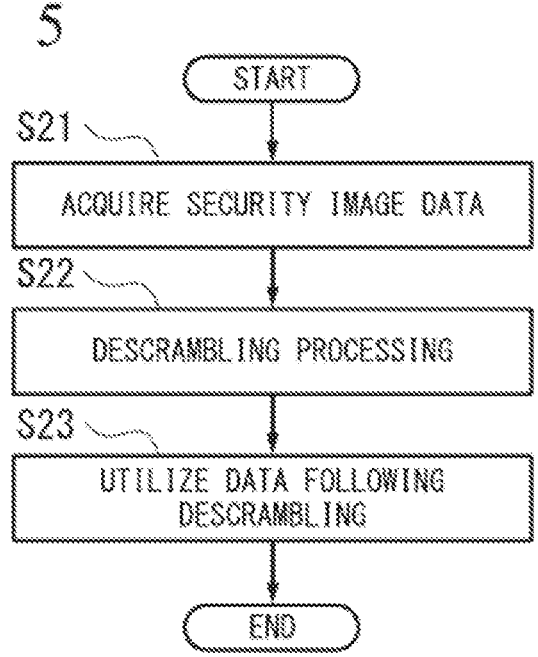
FIG. 5 is a diagram showing a process flow of a server terminal device in which a security system according to the first exemplary embodiment of the present invention in operation.

FIG. 5 is a diagram showing a process flow of a server terminal device 2 in which a security system according to the first exemplary embodiment of the present invention is in operation.

The processing up until the security system operated by the server terminal device 2 utilizes the image data acquired from the edge terminal device 1, is described with reference to FIG. 5.

Firstly, in the server terminal device 2, the communication unit 21 acquires security image data via a network (step S21). The communication unit 21 outputs the acquired security image data to the decryption unit 22. Then, the decryption unit 22, for example, uses a private key corresponding to the public key used in the scrambling processing by the first output unit 12, to perform descrambling processing that decrypts the acquired security image data (step S22). The decryption unit 22 records the image data, including the decrypted personal information, in the storage unit 24. Next, the application execution unit 23 executes an application program of the security system, and utilizes the image data following descrambling (step S23). A specific example relating to the utilization of image data is described. For example, the application execution unit 23 may compare by means of a facial recognition technique, the image data of the person appearing in the image, which is configured by image data, against image data of a person registered in a blacklist and the like, to determine whether or not a person viewed as dangerous is present in the store 100. As another example, in a case where a security guard performs real-time surveillance and discovers that a robbery, shoplifting, and the like, has occurred in the store 100, the image data may be used to identify a person involved in the incident.

Figure 6:
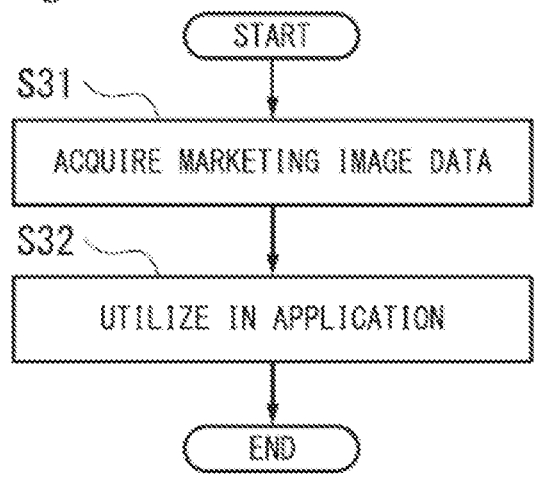
FIG. 6 is a diagram showing a process flow of a server terminal device in which a marketing system according to the first exemplary embodiment of the present invention is in operation.

FIG. 6 is a diagram showing a process flow of a server terminal device 3 in which a marketing system according to the first exemplary embodiment of the present invention is in operation.

The processing up until the marketing system operated by the server terminal device 3 utilizes the image data acquired from the edge terminal device 1, is described with reference to FIG. 6.

Firstly, in the server terminal device 3, the communication unit 31 acquires marketing image data via the network NW (step S31). The communication unit 31 records the acquired marketing image data in the storage unit 34. Then, the application execution unit 33 executes an application program of the marketing system and utilizes the image data in which the personal information has been converted to attribute information, and the attribute information (step S32). A specific example of utilization of image data and attribute information is described. For example, the application executing unit 33 may generate information that is useful for promoting sales by predicting product demand from the attribute information (age group, gender, flow line, at-shelf behavior) of the customer appearing in the image data, and analyzing purchasing trends according to the age group, the gender, the region, the season, and the like.

According to the first exemplary embodiment, it is possible to output data in which personal information for security is included, and data in which attribute information of a customer for marketing is included, without separately installing a security camera and system for security, and an observation camera and system for marketing.

Second Exemplary Embodiment

Hereunder, an information output system according to a second exemplary embodiment of the present invention is described with reference to FIG. 7.

Figure 7:
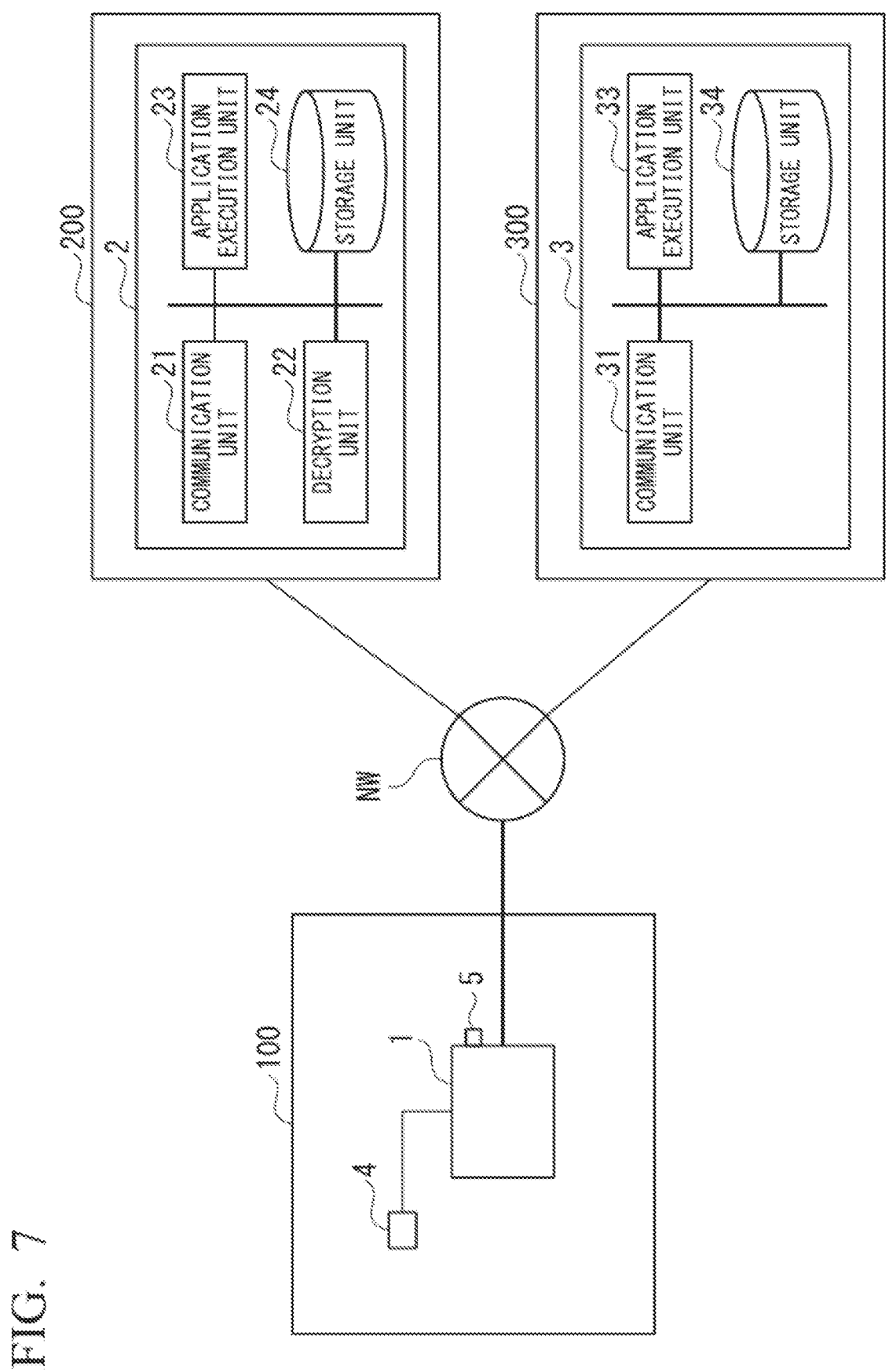
FIG. 7 is a diagram showing an example of an information output system according to a second exemplary embodiment of the present invention.

FIG. 7 is a diagram showing an example of the information output system according to the second exemplary embodiment of the present invention. The sections in which the second exemplary embodiment are different from the first exemplary embodiment are described with reference to FIG. 7.

As shown in FIG. 7, in the information output system according to the second exemplary embodiment, an external terminal unit 5 is connected to the edge terminal device 1. The external terminal unit 5 is, for example, provided from the administrator of the security system of the server terminal device 2 to the store 100 that utilizes the services of that security system. The external terminal unit 5 represents a USB dongle for example. The external terminal unit 5 has recorded in it, an encryption program that performs scrambling processing, and an encryption key. The first output unit 12 of the edge terminal device 1 calls and executes the encryption program recorded in the external terminal unit 5, and performs scrambling processing with respect to the image data acquired from the information acquisition unit 11.

In a case where the external terminal unit 5 is not connected, the first output unit 12 does not operate, and output of image data is unable to be performed. In the server terminal device 2, a decryption key corresponding to the encryption key, which is recorded in the external terminal unit 5, is recorded in the storage unit 24. The decryption unit 22 performs descrambling processing with respect to the image data using the decryption key.

In this manner, a portion of the scrambling processing function of the first output unit 12 delegated to the external terminal unit 5. Further, the provider of the external terminal unit 5 is the administrator of the security system. Consequently, the administrator of the security system is able to conceal information related to the encryption of the image data. As a result, security is more easily assured.

Furthermore, it is not necessary for the edge terminal device 1 to implement a scrambling processing function. Therefore, development costs can be inhibited.

Third Exemplary Embodiment

Hereunder, an information output system of a third exemplary embodiment of the present invention is described with reference to FIG. 8.

Figure 8:
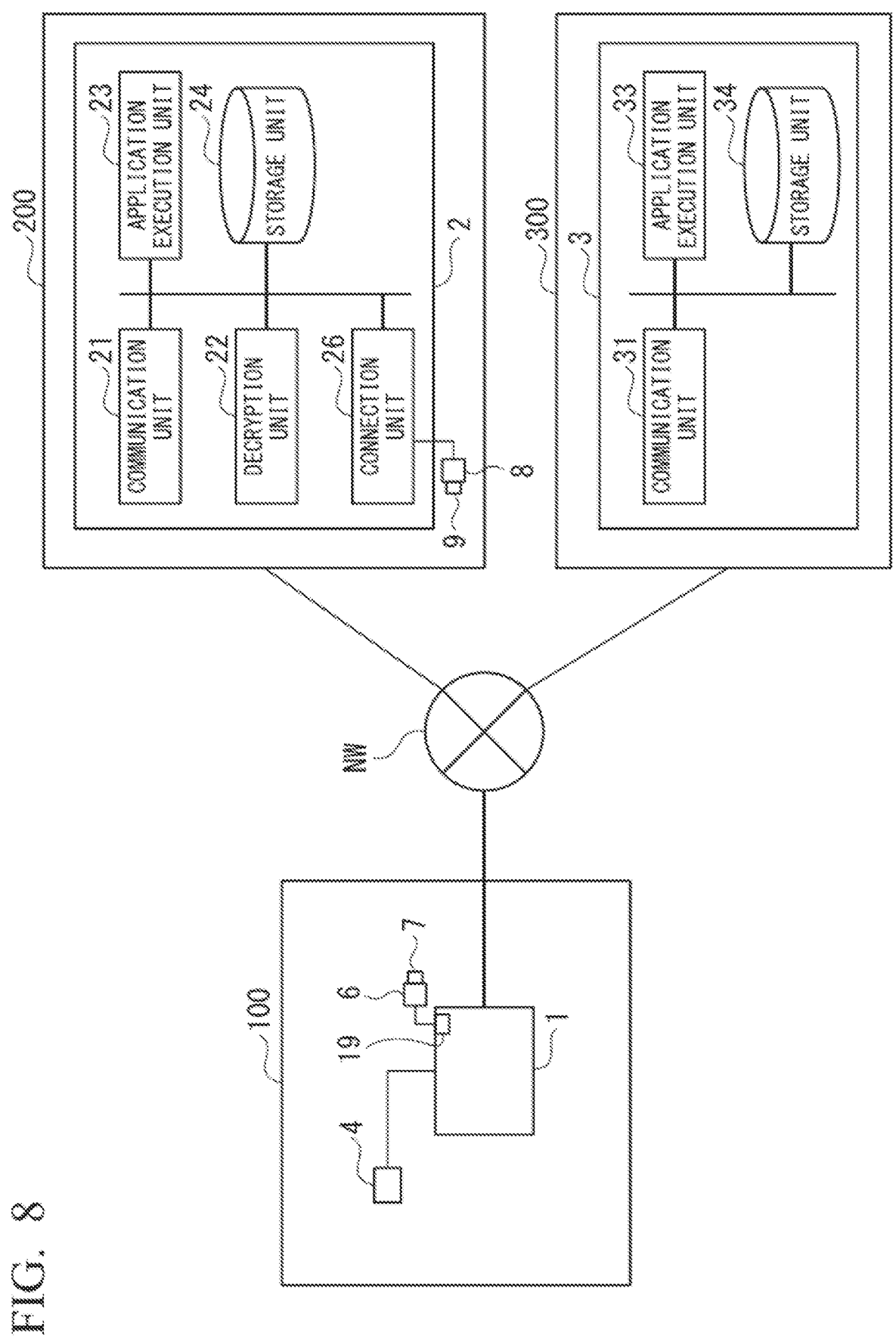
FIG. 8 is a diagram showing an example of an information output system according to a third exemplary embodiment of the present invention.

FIG. 8 is a diagram showing an example of the information output system according to the third exemplary embodiment of the present invention. The sections in which the third exemplary embodiment are different from the first and second exemplary embodiments are described with reference to FIG. 8.

As shown in FIG. 8, in the information output system according to the third exemplary embodiment, a card reading device 6 is connected to the edge terminal device 1. That is to say, the edge terminal device 1 has a second connection unit 19 to which the card reading device 6 is connected. The card reading device 6 is equipped with a key card 7 in which an encryption key is recorded. The first output unit 12 of the edge terminal device 1 reads out the encryption key recorded in the key card 7 via the second connection unit 19. The first output unit 12 utilizes the encryption key that was read out, to perform scrambling processing with respect to image data acquired from the information acquisition unit 11. In the same manner, a card reading device 8 is connected to the server terminal device 2. That is to say, the server terminal device 2 has a connection unit 26 to which the card reading device 8 is connected. The card reading device 8 is equipped with a key card 9 for example. A decryption key corresponding to the encryption key of the key card 7 is recorded in the key card 9. In the server terminal device 2, the decryption unit 22 uses the decryption key recorded in the key card 9, to decrypt the image data following scrambling processing acquired from the edge terminal device 1. An IC card may be used as the key card 7 and the key card 9 for example.

In this manner, in the third exemplary embodiment, the encryption key is modularized and recorded in a detachable medium (key card). As a result of using key cards 7 and 9 in which a digital certificate issued by an official authentication organization is stored, the reliability of the encryption system is assured, and it is possible to reduce the risk of personal information being leaked.

Fourth Exemplary Embodiment

The first to third exemplary embodiments were described using an example of a case where the acquired information that is acquired by the information acquisition unit 11 is image data. The fourth exemplary embodiment is an exemplary embodiment in which the acquired information is not image data.

[When Acquired Information is Audio]

In a case where the acquired information is audio, the sensor S connected to the edge terminal device 1 represents, for example, a microphone provided with a sound collection function. The first output unit 12 encrypts the audio data that is acquired by the microphone, and then outputs it. The second output unit 13 estimates the age group and gender of the speaker from the acquired audio data, associates the estimated information with that audio data, and records it in the storage unit 16. The second output unit 13 performs, as personal information conversion processing, processing such as band compression or noise addition with respect to the acquired audio data, such that an individual cannot be identified by voiceprint analysis. Then, the second output unit 13 outputs the audio data after personal information conversion processing has been performed. The second output unit 13 may output attribute information together with the audio data after the personal information conversion processing has been performed. The second output unit 13 may, in addition to the age group of the speaker, convert the spoken content to text data by means of a voice recognition technique, and then output the text data, and the like.

In a case where the acquired information is audio, information such as the gender, the age group, and the spoken content represent attribute information.

In the server terminal device 2, the decryption unit 22 decrypts the encrypted audio. An application program of the security system that is executed by the application execution unit 23 may use the audio data following decryption to perform surveillance. The application execution unit 23 may record the audio data following decryption in the storage unit 24 as evidence.

In the server terminal device 3, an application program of the marketing system executed by the application execution unit 33 may use the attribute information and the audio data following conversion, or the text data from voice recognition, acquired via the communication unit 31, to analyze the needs of a customer that has visited the store 100, and the like. For example, as a result of the store clerks wearing a microphone, and performing analysis of a conversation between a store clerk and a customer, it is possible to analyze the types of products the customer is searching for, or a complaint from the customer, and to use this to create better stores.

[When Acquired Information is Fingerprint, Palm Print, Vein Pattern, Iris Pattern, and the Like]

In a case where the acquired information is fingerprint data, the sensor S represents a fingerprint sensor. Currently, the use of biometric authentication by means of fingerprint data, and the like, is progressing. A specific example of a case where a fingerprint sensor is installed in a store 100 is described below.

In the store 100, a special customer system which provides a variety of benefits is introduced. As a condition of a certain customer becoming a special customer of the store 100, fingerprint data of that customer, and personal information of that customer are recorded beforehand in the storage unit 16 of the edge terminal device 1 such that they are associated. When that customer performs authentication by bringing a finger into contact with a fingerprint sensor at an entrance or at a register, points are added each time that customer comes to the store for example. If fingerprint authentication is performed at a register, points corresponding to the purchase amount are applied. In this case, the first output unit 12 encrypts the fingerprint data acquired from the fingerprint sensor connected to the edge terminal device 1, and then outputs it. From the acquired fingerprint data, the second output unit 13 acquires information such as the age group and gender of the customer from the personal information of the customer, which is stored in the storage unit 16 of the edge terminal device 1 in association with the fingerprint data. In the case where the storage unit 16 records for each customer, information such as whether that customer is a good customer, and the number of store visits, such that it is associated with the fingerprint data, the second output unit 13 may read out these pieces of information. Such information, that is to say, information such as the gender, the age group, whether or not the customer is a good customer, and the number of store visits, represents attribute information. The second output unit 13 outputs the attribute information corresponding to the fingerprint data acquired from the information acquisition unit 11.

In the server terminal device 2, the decryption unit 22 decrypts the encrypted fingerprint data. An application program of the security system executed by the application execution unit 23 records the fingerprint data following decryption in the storage unit 24, for example, such that it is associated with the position information of the store 100 and the time in which the fingerprint data was acquired. Consequently, it becomes evidence that the customer was present in the store 100 at that time.

In the server terminal device 3, an application program of the marketing system executed by the application execution unit 33 uses the attribute information acquired via the communication unit 31 to perform analysis of the purchasing behavior of the special customers visiting the store 100, and the like. For example, if the store 100 is a chain store, it is possible to know the purchasing behavior of the special customers across a plurality of stores. A case where the acquired information represents a palm print, a vein pattern, or an iris pattern, is the same as the case of fingerprint data.

Fifth Exemplary Embodiment

A fifth exemplary embodiment is an exemplary embodiment of a case where there is only one output unit. Hereunder, an edge terminal device 1 according to the fifth exemplary embodiment of the present invention is described with reference to FIG. 9.

Figure 9:
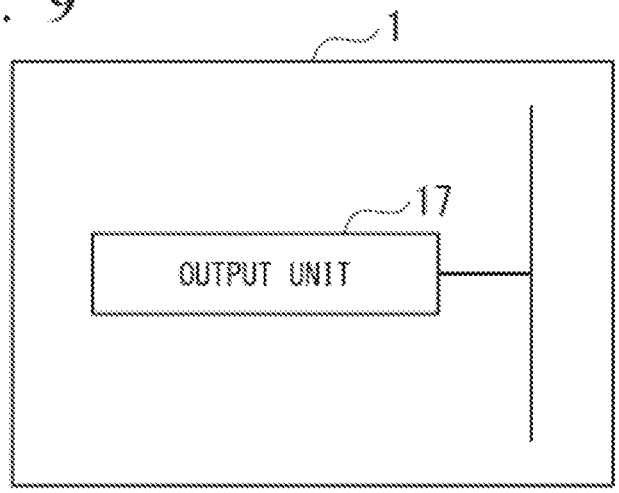
FIG. 9 is a diagram showing a configuration of an edge terminal device according to a fifth exemplary embodiment of the present invention.

FIG. 9 is a diagram showing a configuration of the edge terminal device 1 according to the fifth exemplary embodiment of the present invention.

As shown in FIG. 9, the edge terminal device 1 includes at least an output unit 17.

The output unit 17 outputs, at least one of first output information, which outputs acquired information that is acquired by a sensor, and second output information, in which personal information included in the acquired information that is acquired by the sensor is converted into attribute information by which an individual cannot be identified.

An example of a specific configuration of the edge terminal device 1 in the fifth exemplary embodiment is described. The edge terminal device 1 in the fifth exemplary embodiment, in addition to the output unit 17, includes, an information acquisition unit 11, a communication unit 14, an output determination unit 15, and a storage unit 16. The configuration of these is the same as the configuration described with reference to FIG. 2.

A process flow of the fifth exemplary embodiment is described with reference to FIG. 4. Firstly, the information acquisition unit 11 acquires image data captured by the camera 4 (step S11). The information acquisition unit 11 outputs the acquired image data to the output unit 17. Then, the output unit 17 acquires an encryption key (step S12), and performs scrambling processing with respect to the image data acquired from the information acquisition unit 11 (step S13). Next, the output unit 17 selects the communication interface of the communication unit 14 that is connected to the server terminal device 2, and transmits security image data following scrambling processing (first output information) to the server terminal device 2 via that communication interface (step S14).

The output determination unit 15 determines whether or not to output marketing image data (step S15), and outputs the result thereof to the output unit 17. The output determination unit 15 may determine, by means of image recognition, whether or not a person is included in the image data, and it may determine that marketing image data is to be output only in a case where a person is included in the image data. If the output determination unit 15 determines that marketing image data is to be output, the output unit 17 performs personal information conversion processing with respect to the image data acquired from the information acquisition unit 11 (step S16), and generates marketing image data (including attribute information and data converted to text). Then, the output unit 17 selects the communication interface of the communication unit 14 that is connected to the server terminal device 3, and transmits the generated marketing image data (second output information) to the server terminal device 3 via that communication interface (step S17). The other processing steps are the same as in the first exemplary embodiment.

The output determination unit 15 may determine, by means of image recognition, whether or not a person is included in the image data, and it may transmit security image data to the server terminal device 2 only in a case where a person is included in the image data.

Sixth Exemplary Embodiment

Hereunder, a camera 5 according to a sixth exemplary embodiment of the present invention is described with reference to FIG. 10.

Figure 10:
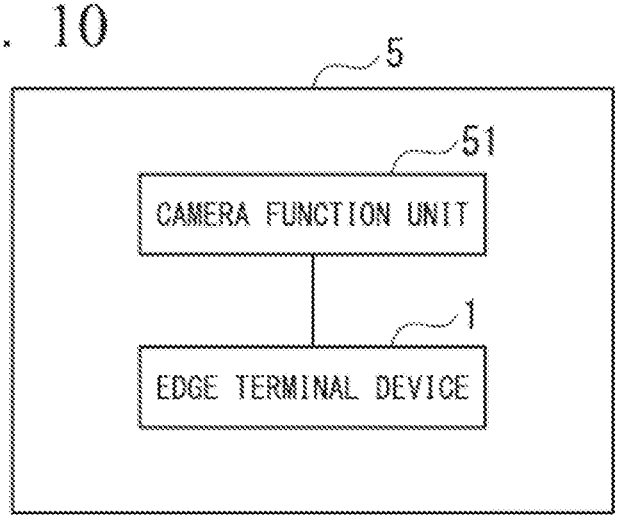
FIG. 10 is a diagram showing a configuration of a camera according to a sixth exemplary embodiment of the present invention.

As shown in FIG. 10, the camera 5 includes an edge terminal device 1 and a camera function unit 51. The configuration and the functions of the edge terminal device 1 shown in FIG. 10 are the same as those of the edge terminal device 1 shown in FIG. 1 except in the aspect that the camera function unit 51 is connected to the first connection unit 18 instead of the sensor S. The configuration and the functions of the camera function unit 51 are the same as the camera 4 shown in FIG. 3.

The edge terminal device 1 mentioned above has a computer in its interior. Further, the processing steps of the edge terminal device 1 mentioned above are recorded in a computer-readable recording medium in the form of a program, and the processing described above is performed by means of the computer reading the program and then executing it. Here, the computer-readable recording medium refers to a magnetic disk, a magnetic optical disk, a CD-ROM, a DVD-ROM, a semiconductor memory, and the like. Furthermore, the computer program may be distributed to a computer by means of a communication line, and the computer receiving the distribution may execute that program.

The program described above may represent a program for realizing a portion of the functions mentioned above.

The program described above may be one that realizes the functions mentioned above by being combined with a program already stored in the computer system, as a so-called difference file (difference program).

In addition, the configuration elements in the exemplary embodiments described above may be appropriately substituted with well-known configuration elements without departing from a scope of the present invention. For example, the video data may be also audio data or image data, such as a still image. Furthermore, the technical scope of the present invention is in no way limited to the exemplary embodiments described above, and various changes may be applied without departing from the scope of the present invention. The edge terminal device 1 is an example of an information output device. The server terminal device 2 is an example of a first server terminal device. The server terminal device 3 is an example of a second server terminal device. The external terminal unit 5 is an example of an external connection device.

This application is based upon and claims the benefit of priority from Japanese patent application No. 2015-005538, filed Jan. 15, 2015, the disclosure of which is incorporated herein in its entirety by reference.

INDUSTRIAL APPLICABILITY

The present invention may be applied to an information output device, a camera, an information output system, an information output method, and a program.

REFERENCE SYMBOLS

1 Edge terminal device
2 Server terminal device
3 Server terminal device
4 Camera
5 External terminal unit
6, 8 Card reading device
7, 9 Key card
11 Information acquisition unit
12 First output unit
13 Second output unit
14 Communication unit
15 Output determination unit
16 Storage unit
18 First connection unit
19 Second connection unit
21, 31 Communication unit
22 Decryption unit
23, 33 Application execution unit
24, 34 Storage unit
26 Connection unit
51 Camera function unit

The invention claimed is:

1. An information output device comprising:
a card reader configured to read an encryption key from a key card;
at least one memory storing instructions; and
at least one processor configured to execute the instructions to:
  read the encryption key from the key card, using the card reader;
  acquire an image from a camera;
  determine whether a person other than a store clerk appears in the acquired image and whether or not a current time is within the business hours of a store;
  extract attribute information of the person other than the store clerk from the acquired image;
  perform, by using the encryption key, scrambling processing with respect to the person included in the acquired image;
  based on the determination of whether or not the person other than the store clerk appears in the acquired image and whether or not the current time is within the business hours of the store, do not output the scrambled image and the attribute information in a case where the current time is not within the business hours;
  based on the determination of whether or not the person other than the store clerk appears in the acquired image and whether or not the current time is within the business hours of the store, do not output the scrambled image and attribute information in a case where the current time is within the business hours and the person other than the store clerk is not included in the acquired image;
  based on the determination of whether or not the person other than the store clerk appears in the acquired image and whether or not the current time is within the business hours of the store, output the scrambled image and the attribute information in a case where the current time is within the business hours and the person other than the store clerk is included in the acquired image;

perform, by using a decryption key corresponding to the encryption key, descrambling processing with respect to the scrambled image;

determine whether or not the person included in the descrambled image is registered in a list by comparing the person included in the descrambled image with the list, the list including a plurality of images of people; and output a determination result of whether or not the person is registered in the list.

2. The information output device according to claim 1, wherein the attribute information represents at least any one of an age group and gender.

3. The information output device according to claim 1, wherein the output acquired image is used for marketing analysis.

4. The information output device according to claim 3, wherein the at least one processor is further configured to execute the instructions to perform the marketing analysis.

5. The information output device according to claim 4, wherein the at least one processor is further configured to execute the instructions to analyze flow lines and at-shelf behavior of the person.

6. The information output device according to claim 4, wherein the at least one processor is further configured to execute the instructions to output text data which represents a result of the marketing analysis.

7. The information output device according to claim 1, wherein the at least one processor is further configured to execute the instructions to:

acquire the image which is encrypted from the camera; and decrypt the acquired image.

8. An information output method performed by a computer and comprising:

reading an encryption key from a key card;

acquiring an image from a camera;

determining whether a person other than a store clerk appears in the acquired image and whether or not a current time is within the business hours of a store;

extracting attribute information of the person other than the store clerk from the acquired image;

performing, by using the encryption key, scrambling processing with respect to the person included in the acquired image;

based on the determination of whether or not the person other than the store clerk appears in the acquired image and whether or not the current time is within the business hours of the store, not outputting the scrambled image and the attribute information in a case where the current time is not within the business hours;

based on the determination of whether or not the person other than the store clerk appears in the acquired image and whether or not the current time is within the business hours of the store, not outputting the scrambled image and attribute information in a case where the current time is within the business hours and the person other than the store clerk is not included in the acquired image;

based on the determination of whether or not the person other than the store clerk appears in the acquired image and whether or not the current time is within the business hours of the store, outputting the scrambled image and the attribute information in a case where the current time is within the business hours and the person other than the store clerk is included in the acquired image;

performing, by using a decryption key corresponding to the encryption key, descrambling processing with respect to the scrambled image;

determining whether or not the person included in the descrambled image is registered in a list by comparing the person included in the descrambled image with the list, the list including a plurality of images of people; and outputting a determination result of whether or not the person is registered in the list.

9. A non-transitory computer-readable recording medium storing a program for causing a computer to execute:

reading an encryption key from a key card;

acquiring an image from a camera;

determining whether a person other than a store clerk appears in the acquired image and whether or not a current time is within the business hours of a store;

extracting attribute information of the person other than the store clerk from the acquired image;

performing, by using the encryption key, scrambling processing with respect to the person included in the acquired image;

based on the determination of whether or not the person other than the store clerk appears in the acquired image and whether or not the current time is within the business hours of the store, not outputting the scrambled image and the attribute information in a case where the current time is not within the business hours;

based on the determination of whether or not the person other than the store clerk appears in the acquired image and whether or not the current time is within the business hours of the store, not outputting the scrambled image and attribute information in a case where the current time is within the business hours and the person other than the store clerk is not included in the acquired image;

based on the determination of whether or not the person other than the store clerk appears in the acquired image and whether or not the current time is within the business hours of the store, outputting the scrambled image and the attribute information in a case where the current time is within the business hours and the person other than the store clerk is included in the acquired image;

performing, by using a decryption key corresponding to the encryption key, descrambling processing with respect to the scrambled image;

determining whether or not the person included in the descrambled image is registered in a list by comparing the person included in the descrambled image with the list, the list including a plurality of images of people; and outputting a determination result of whether or not the person is registered in the list.

* * * * *